United States Patent [19]

Kornberg et al.

[11] Patent Number: 5,045,618

[45] Date of Patent: Sep. 3, 1991

[54] FLAME-RETARDANT COMPOSITIONS

[75] Inventors: Nurit Kornberg, Lehavim; Michael R. Peled, Beer-Sheva; Jacob Scheinert, Omer, all of Israel

[73] Assignee: Bromine Compounds Ltd., Beer - Sheva, Israel

[21] Appl. No.: 589,200

[22] Filed: Sep. 27, 1990

[30] Foreign Application Priority Data

Sep. 28, 1989 [IL] Israel .......................................... 91820
Aug. 14, 1990 [IL] Israel .......................................... 95382

[51] Int. Cl.$^5$ .............................................. C08F 18/20
[52] U.S. Cl. .................................. 526/292.5; 525/209; 526/240; 526/241
[58] Field of Search ...................... 525/209; 526/292.5, 526/240, 241

[56] References Cited

U.S. PATENT DOCUMENTS

| | | | |
|---|---|---|---|
| 4,059,618 | 11/1977 | Blumenfeld et al. | 526/292.5 |
| 4,110,296 | 8/1978 | Wang | 526/292.5 |
| 4,119,612 | 10/1978 | Vollkommer et al. | 528/232 |
| 4,128,709 | 12/1978 | Vollkommer et al. | 526/292.5 |
| 4,211,730 | 7/1980 | Vollkommer et al. | 526/219.6 |
| 4,996,276 | 2/1991 | Fishler et al. | 526/292.5 |

FOREIGN PATENT DOCUMENTS 2527802 12/1976 Fed. Rep. of Germany .
2276287 1/1976 France .
2018750 11/1979 United Kingdom .

*Primary Examiner*—Paul R. Michl
*Assistant Examiner*—Christopher P. Rogers
*Attorney, Agent, or Firm*—Michael N. Meller

[57] ABSTRACT

A novel flame-retardant material is prepared by copolymerizing pentabromobenzyl-acrylate with a metal salt of a compound of Formula I:

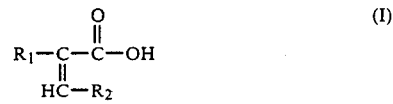

wherein $R_1$ is H or lower alkyl, and $R_2$ is selected from H, lower alkyl and

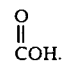

The novel flame retardant has improved thermal stability and is useful in a variety of uses, e.g. as a flame retardant in engineering plastics and styrenic.

24 Claims, 2 Drawing Sheets

FLAME-RETARDANT COMPOSITIONS

FIELD OF THE INVENTION

The present invention relates to novel flame-retardant compositions having improved thermal stability, to plastic materials containing it, and to a method for improving the thermal stability of synthetic resins. More particularly, the invention refers to flame-retardant compositions containing copolymers of poly-pentabromobenzyl acrylate (PBB-PA).

BACKGROUND OF THE INVENTION

PBB-PA has been known for some time, and is a valuable flame-retardant material, useful in a number of synthetic resins. PBB-PA is prepared by the polymerization of pentabromobenzylester acrylate (PBB-MA), e.g., by the process described in DE 25 27 802. The PBB-PA polymeric flame-retardant material is incorporated into the synthetic resin to which it is desired to impart flame-retardant properties, by techniques known in the art.

The use of this valuable flame-retardant material, however, has been somewhat limited so far because of its limited thermal stability. Thermal stability, as will be known to the skilled person, is an important property both in the lifetime of the synthetic resin which embodies the flame-retardant material, as well as during its preparation. The use of many flame-retardant materials is limited, because the compounding temperatures required in order to incorporate it into a given resin are too high, and the flame-retardant material is not thermally stable enough to permit its compounding at such temperatures. Consequently, flame-retardant materials which would be efficient in certain resins are not used, because it is impossible to effect the compounding operation, without adversely affecting the flame-retardant material.

SUMMARY OF THE INVENTION

It has now been found, and this is an object of the present invention, that it is possible to provide copolymers based on PBB-MA, which possess improved thermal stability, and which thus can be employed with a number of synthetic resins requiring high compounding temperatures. It has further been surprisingly found that it is possible, by relatively slight modifications, to obtain the advantages provided by the improved characteristics of the flame-retardant material, without causing the final compound which incorporates it substantially to depart from the behavior of a final compound embodying substantially pure PBB-PA. This, as will be apparent to the skilled person, is very important, because it opens the door for a wide use of the product obtained according to this invention.

Thus, the invention is primarily directed to a novel flame-retardant material comprising a copolymer resulting from the copolymerization of pentabromobenzyl acrylate with a metal salt of a compound of Formula I:

$$R_1-\underset{\underset{HC-R_2}{\parallel}}{C}-\overset{O}{\overset{\parallel}{C}}-OH \quad (I)$$

and wherein $R_1$ is H or lower alkyl, and $R_2$ is selected from H, lower alkyl and

According to a preferred embodiment of the invention, the metal, generally indicated by M in this specification, is selected from Mg, Zn, Na and K. Still more preferably, the metal salt is selected from the group consisting essentially of sodium acrylate, magnesium acrylate, zinc acrylate, potassium acrylate, bis-sodium-maleate, and their mixtures.

The amount of metal salt contained should normally not exceed 50% by mole of the total content of the flame-retardant material.

Thus, the copolymer of the invention will be constituted of the repetitive units shown in formula II

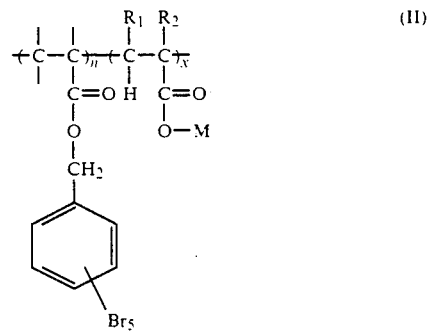

wherein $R_1$, $R_2$ and M have the meanings defined above, and the ratio x/n is equal or less than 1.

It should be noted that the improvement in thermal stability properties has a maximum, and that the addition of too much salt may impair the properties of the resulting product. Thus, for instance, when sodium acrylate is employed, the amount of sodium acrylate employed should preferably not exceed 7%, and should more preferably be comprised between 1.5 and 9 wt. %, still more preferably, about 3 wt. %.

The invention, as will be understood by the skilled chemist, also embraces a method for imparting thermal stability to a PBB-PA-based polymer, which method comprises copolymerizing PBB-MA with a compound of Formula I, as hereinbefore defined. Thus, any of the known polymerization processes which polymerize PBB-MA to obtain PBB-PA can be easily modified, according to the invention, by adding a compound of Formula I to the polymerization mixture, to obtain a copolymer as herein described.

Flame-retarded synthetic articles which contain a flame-retardant material according to the invention, of course also form part of this invention.

The process and advantages of the invention and of the resulting novel flame-retardant composition will now be further illustrated through the following examples, which are provided for the purpose of illustration and are not intended to constitute a limitation of the invention.

DETAILED DESCRIPTION OF THE INVENTION

Example 1

Preparation in solution

Figure 1:
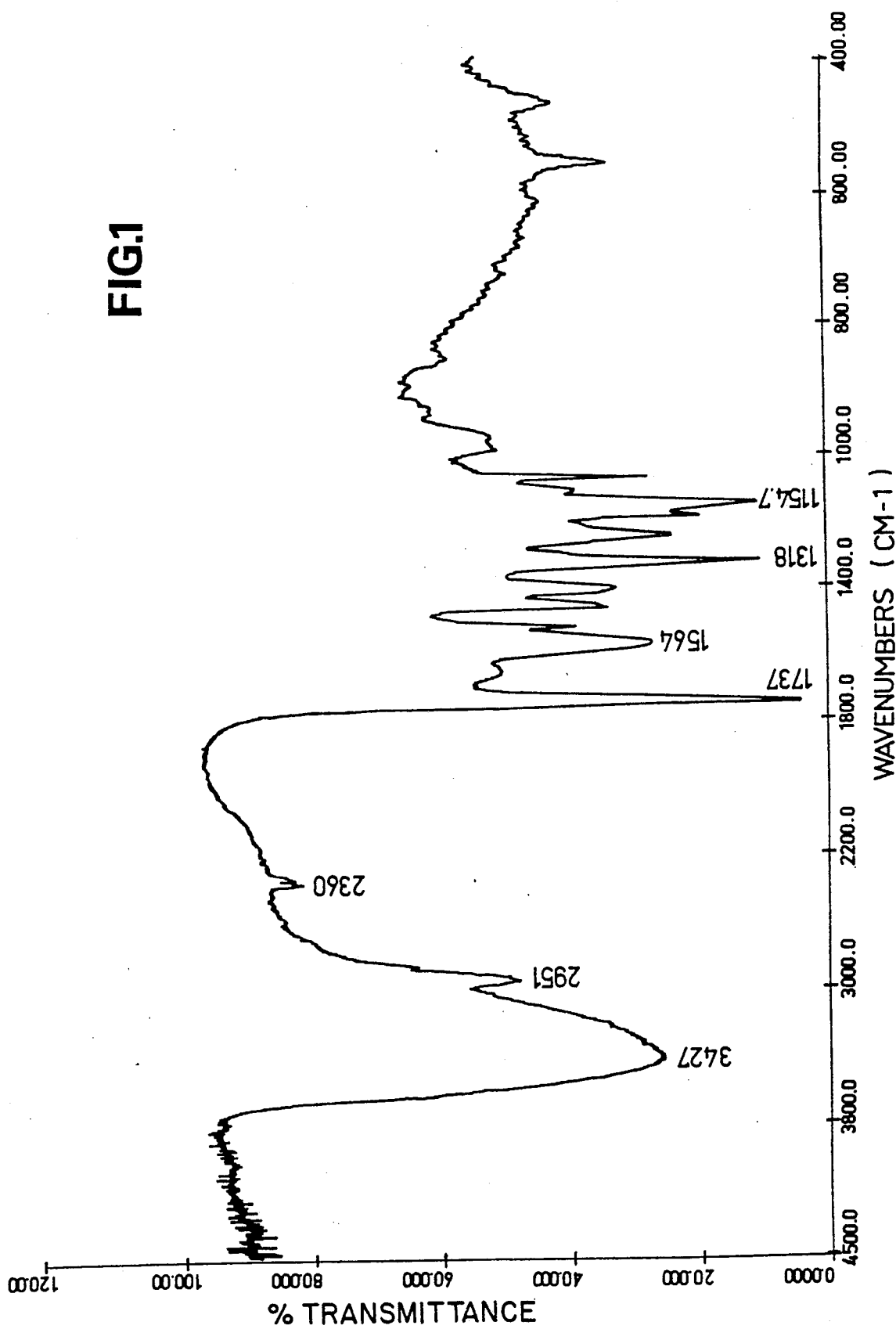

To a 50 ml, three-necked flask containing 0.72 g (0.01 mole) of acrylic acid there are added 0.95 g of $NaHCO_3$ which were previously slurried in about 1 ml of water. This addition results in the evolution of $CO_2$ gas, and when evolution is completed methylethyl ketone, 25 ml, is added, together with 22.4 g PBB-MA (0.04 mole). Nitrogen is bubbled through the solution for a few minutes. The flask, which is equipped with a stirrer and a condenser is put into a thermostatic bath preheated to 100°–105° C. During the first minutes, the mixture is very viscous and is difficultly stirred, but the materials then dissolve almost completely and stirring becomes easier. At this stage, the initiator, benzoyl peroxide (0.04 g in crystalline form), which has been previously dissolved in 1 ml methylethyl ketone is added. The mixture obtained is heated for about one half hour, during which time a heavy precipitate is formed. When this period has lapsed, the mixture is cooled to room temperature, diluted with methylene chloride and vacuum-filtered and washed again with methylene chloride. 22.5 g of a dry solid are obtained, with a yield in excess of 95%. The above process was carried out with 8 different PBB-MA/sodium acrylate ratios, and the resulting product was tested for thermal stability. Thermal stability was tested as follows: heating with a heating rate of 50° C. per minute in a nitrogen atmosphere up to 290° C. and then keeping the sample at 290° C. for one half hour. Weight losses resulting from this procedure were recorded. The material tested in the thermal stability test was previously dried to constant weight.

The result for 10 experiments, together with the exact compositions, are reported in Table I below. The results clearly indicate a substantial improvement of the thermal stability of the product, throughout the entire range of sodium acrylate concentrations. Optimal results were obtained with about 2 to about 8 wt. % sodium acrylate in PBB-MA. It should be noted that the weight loss for pure PBB-PA under the test conditions was between 40–75%, while optimum conditions brought this weight loss to values as low as 3%.

TABLE I

| | Thermal Stability of Product Polymerized in Solution | | |
|---|---|---|---|
| Experiment No. | gr Na Acrylate/ 100 gr PBB-MA | Mole Na Acrylate/ Mole PBB-MA | Weight loss (%) |
| 1 | 0 | 0 | 54 |
| 2 | 0 | 0 | 40–54 |
| 3 | 0 | 0 | 75 |
| 4 | 0.5 | 0.03 | 18 |
| 5 | 1.0 | 0.06 | 10 |
| 6 | 2.1 | 0.12 | 3 |
| 7 | 4.2 | 0.24 | 3 |
| 8 | 8.4 | 0.50 | 3 |
| 9 | 12.6 | 0.76 | 6 |
| 10 | 16.8 | 1.00 | 7 |

It should be noted that the results for pure PBB-PA are erratic, giving weight losses ranging from 40% to 75% when all conditions are kept substantially constant. This does not happen with the compositions of the invention, in which only insignificant fluctuations of this value are noted.

The compositions according to the invention have been fully characterized as being of structure II, both by elemental and spectroscopic analyses. By way of illustration, the results for the material obtained according to Experiment No. 10, (16.8% Na-Acrylate) are reported below.

% Na:theoretical: 4.11, found: 3.94. % Br:theoretical: 59.75, found: 59.33.

Figure 2:
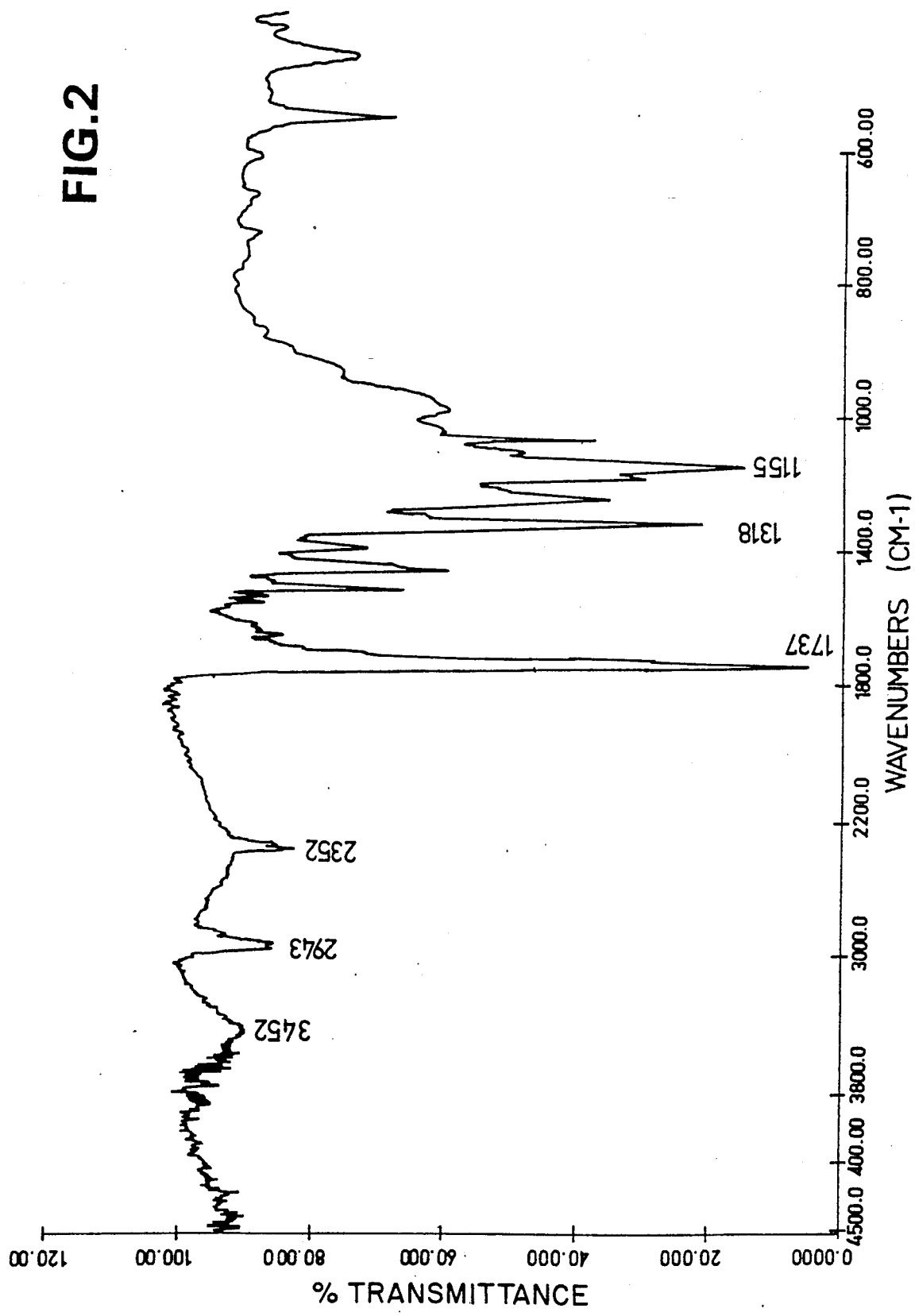

FT-IR spectra of the product were prepared using KBr as a standard. One such spectrum is shown in FIG. 1, in which the characteristic peaks of the salt are seen at 1318 $cm^{-1}$ and at 1564 $cm^{-1}$. The spectrum of pure PBB-PA (Experiment No. 2) is also shown in FIG. 2 for the purpose of comparison.

Example 2

Thermal Polymerization in an Extruder

A mixture of PBB-MA and sodium acrylate in the desired proportions, with and without a radical initiator, were polymerized in an extruder. The polymerization temperature was between 140°–240° C. The residence time in the extruder was 1–10 minutes. The polymer obtained in this process was ground to a powder, before thermal stability was evaluated. Thermal stability was evaluated as in the previous experiment, and the results are shown in Table II below. It can be seen from the results of this table that no substantial difference was seen between the product polymerized in solution, and that heat-polymerized in an extruder.

TABLE II

| | Thermal Stability of Product Polymerized by Extrusion | | |
|---|---|---|---|
| Experiment No. | Catalyst | gr Na Acrylate/ 100 g PBB-MA | Weight loss (%) |
| 1 | none | 3 | 6 |
| 2 | Luperox-D-1 0.1% | 3 | 4 |
| 3 | Luazo AD 0.05% | 3 | 4 |

The product obtained in Experiment No. 1 was analyzed to give: % Na:Calcd: 0.73, found: 0.50. % Br:Calcd: 69.66, found: 69.31.

Example 3

Copolymerization with Different Salts

Example 1 was repeated, using a number of different salts, to show the effect of different compounds of Formula I on the thermal stability of the resulting product. The results are shown in Table III below, from which it can be appreciated that all salts tested give an appreciable improvement, as compared with the 40–75% weight loss of the product which does not contain any copolymerized salt. Small fluctuations in the thermal stability between different salts are not such as to substantially change this conclusion.

TABLE III

| Thermal Stability of Different Copolymers | | |
|---|---|---|
| Co-Monomer | gr Co-Monomer/ 100 gr PBB-MA | Weight loss (%) |
| Mg-Acrylate | 2 | 8 |
| Zn-Acrylate | 2 | 9 |
| Bis-Na-Maleate | 3 | 13 |
| K-Acrylate | 2 | 5 |

It should be noted that, for the case of sodium acrylate which is believed to be the most convenient of the comonomers employed, when using up to 20 wt. % of sodium acrylate, a polymer is obtained which is a white flowable and homogeneous powder. Amounts higher than 20 wt. % result in two different products, a white powder and an amorphous product which has not been identified, but which is believed to be a polyacrylic acid or a salt thereof. These limiting amounts, therefore, are only related to the nature of the product obtained, and may vary when different salts or compounds of Formula I are employed.

Example 4

Two different compositions based on high-impact polystyrene (HIPS) were prepared, to evaluate the effect of the thermally stabilized PBB-PA on the properties of the final product, as compared with conventional PBB-PA.

The contents of the two compositions tested, containing also conventional additives, as well as the results of the tests, are shown in Table IV below. It can be seen that the Na-acrylate-containing copolymer, while remaining V-O rated, according to UL-94, also improves the results for the Notched Izod Impact and the HDT.

TABLE IV

Comparison of FR and Mechanical Properties with Compositions of the Art in HIPS

| Component/Parameter | Comp. 1 % | Comp. 2 % |
|---|---|---|
| HIPS Vestyron 638 | 82.7 | 82.7 |
| PBB-PA | 12.9 | — |
| PBB-PA containing 3% NaAcrylate (Exp. 2, Example 2) | — | 12.9 |
| Antimony Trioxide | 3.3 | 3.3 |
| Tinuvin P | 0.2 | 0.2 |
| Irganox PS 800 | — | 0.2 |
| Irganox 245 | 0.2 | 0.2 |
| AC 400 A (Allied) | 0.5 | 0.5 |
| UL 94 (3.2 mm) Rate | V-O | V-O |
| Notched Izod Imact (J/m) | 57 | 69 |
| HDT (°C.) | 58 | 62 |
| Br % | 9.3 | 9.0 |

Example 5

Two mixtures of pure PBB-PA, one with 5 wt % Na Acetate, and the other with 5 wt % Na Polyacrylate were prepared. The thermal stability of these mixtures was measured as described in Example 1, to show that non-copolymerized mixtures do not improve the thermal stability. The results are shown in Table V below:

TABLE V

Thermal Stability of Mixtures

| Experiment No. | Component 1 | Component 2 | Wt ratio Comp. 1/ Comp. 2 | Weight loss (%) |
|---|---|---|---|---|
| 1 | PBB-PA | Na Acetate | 95% | 51 |
| 2 | PBB-PA | Na Polyacrylate | 95% | 33 |

As is seen from Table V, the weight losses of these mixtures are of the same order of magnitude as for pure PBB-PA.

Example 6

In order to further illustrate the effect of the metal salt on the thermal stability of PBB-PA, a product obtained according to the procedure described in Example 2, Experiment No. 1, was treated to remove the metal ion, and the treated and untreated materials were compared for thermal stability. The treatment was effected by stirring 32.5 gr of the copolymer in 150 ml of aqueous HCl solution 1:5, for two days. After filtration the cake was washed with distilled water until neutral, and was then washed with methanol. After drying, 28.9 gr of the copolymer were recovered.

The product was tested for weight loss by TGA, as described hereinbefore. TGA was run for 30 minutes, and the results are shown in Table VI below.

TABLE VI

Thermal Stability of Washed and Unwashed Products

| Copolymer | Na Content | Br (%) | Weight Loss (TGA), % |
|---|---|---|---|
| Unwashed | 0.496% | 69.31 | 6.3 |
| Washed | 8.5 ppm | 70.83 | 34.5 |

Example 7

The same PBB-PA/Na Acrylate copolymer of Example 4 was used to prepare flame-retarded glass fiber reinforced polyethylene terephthalate (GFR PET ex Allied Corp.). The properties of the resulting compositions are reported in Table VII.

TABLE VII

Properties of 30% GFR PET

| Component/Parameter | % |
|---|---|
| FR | 9.8 |
| PET (PETRA 130) | 85.3 |
| ANTIMONY TRIOXIDE (ex CAMPINE) | 4.9 |
| UL 94 (0.8 mm) Rate | VO |
| UL 94 (0.8 mm) Rate Max Flame (sec.) | 19.0 |
| UL 94 (0.8 mm) Rate Total Flame (sec.) | 29.0 |
| UL 94 (0.8 mm) Rate Number Ignit. Cotton | 0 |
| Izod Notched Impact (J/m) | 49.0 |
| HDT (°C.) | 162 |
| Br % | 7.0 |

Example 8

Example 7 was repeated, but using 30% GFR polybutylene terephthalate (PBT - ex G.E.P.). The results are shown in Table VIII.

TABLE VIII

Properties of 30% GFR PBT

| Component/Parameter | % |
|---|---|
| FR | 11.4 |
| ANTIMONY TRIOXIDE | 5.7 |
| PBT (Valox 420) | 82.8 |
| UL 94 (0.8 mm) Rate | VO |
| UL 94 (0.8 mm) Rate Max Flame (sec.) | 2.0 |
| UL 94 (0.8 mm) Rate Total Flame (sec.) | 10.0 |
| UL 94 (0.8 mm) Rate No. Ignit. Cotton | 0 |
| Izod Notched Impact (J/m) | 92.0 |
| HDT (°C.) | 202.4 |
| Br % | 8.0 |

Example 9

Example 7 was repeated, but using Nylon 6 (CAPRON 8200 HS, ex Allied Corp.). The results are shown in Table IX.

TABLE IX

| Properties of Nylon 6 | |
|---|---|
| Component/Parameter | % |
| FR | 15.7 |
| ANTIMONY TRIOXIDE | 5.2 |
| CAPRON 8200 HS | 77.5 |
| Mg. Stearate | 0.5 |
| Hostaflon TF 3202 | 1.0 |
| UL 94 (1.6 mm) Rate | VO |
| UL 94 (1.6 mm) Rate Max Flame (sec.) | 8.0 |
| UL 94 (1.6 mm) Rate Total Flame (sec.) | 19.0 |
| UL 94 (1.6 mm) Rate No. Ignit. Cotton | 0 |
| Br % | 11.0 |

Example 10

Example 7 was repeated, but using Acrylonitrile-butadiene-styrene terpolymer (ABS) ex Borg Warner, U.S.A. The results are reported in Table X below.

TABLE X

| Properties of ABS | |
|---|---|
| Component/Parameter | % |
| FR | 20.0 |
| ANTIMONY TRIOXIDE | 4.2 |
| ABS | 75.8 |
| UL 94 (1.6 mm) Rate | VO |
| UL 94 (1.6 mm) Rate Max Flame (sec.) | 1.0 |
| UL 94 (1.6 mm) Rate Total Flame (sec.) | 2.0 |
| UL 94 (1.6 mm) Rate No. Ignit. Cotton | 0 |
| Izod Notched Impact (J/m) | 98.0 |
| HDT (°C.) | 90.0 |
| Br % | 14.0 |

The above description and examples have been given for the purpose of illustration, and are not intended to be limitative. Many modifications can be carried out in the invention, without exceeding its scope.

We claim:

1. A flame-retardant material comprising a copolymer of pentabromobenzyl-acrylate with a metal salt of a compound of Formula I:

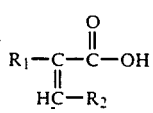

and wherein $R_1$ is H or lower alkyl, and $R_2$ is selected from H, lower alkyl and

2. A copolymer comprising the repetitive units of the formula:

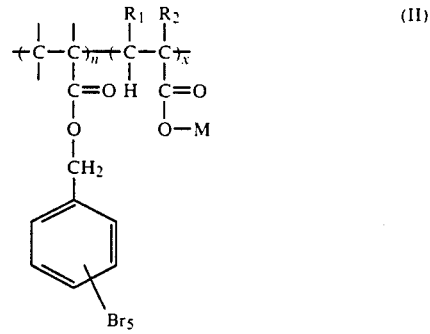

wherein M is a metal ion, $R_1$ is H or lower alkyl, $R_2$ is H, lower alkyl or

and the ratio x/n is equal or less than 1.

3. A flame-retardant material as claimed in claim 1, wherein the metal is selected from the group consisting of Mg, Zn, Na and K.

4. A flame-retardant material as claimed in claim 3, wherein the salt is selected from the group consisting of sodium acrylate, magnesium acrylate, zinc acrylate, potassium acrylate, bis-sodium-maleate, and their mixtures.

5. A method for imparting thermal stability to a pentabromobenzyl-polyacrylate based polymer, comprising copolymerizing pentabromobenzylmonoacrylate with a compound of Formula I, as defined in claim 1.

6. A method according to claim 5, wherein the compound of Formula I is added in amount of up to 9 wt. %.

7. A copolymer of pentabromobenzyl-monoacrylate comprising a metal ion.

8. A copolymer according to claim 7, wherein the metal ion is selected from the group consisting of Mg, Zn, Na and K.

9. A flame-retardant plastic composition comprising a polymeric matrix and a copolymer of pentabromobenzyl-acrylate with a metal salt of a compound of Formula I:

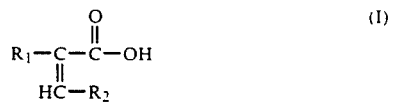

and wherein $R_1$ is H or lower alkyl, and $R_2$ is H, lower alkyl or

10. A flame-retardant composition according to claim 9, wherein the polymeric matrix is selected from engineering plastics and styrenic materials.

11. A flame-retardant composition according to claim 10, wherein the polymeric matrix is selected from the group consisting essentially of HIPS, ABS, PET, PBT, polyamides and blends thereof.

12. A flame-retardant composition according to claim 9, wherein the polymeric matrix is reinforced.

13. A composition according to claim 12, wherein the polymeric matrix is glass fiber reinforced.

14. Flame-retarded synthetic articles containing as a flame-retardant material a compound as defined in claim 1.

15. A flame-retardant material as claimed in claim 2, wherein the metal is selected from the group consisting of Mg, Zn, Na and K.

16. A flame-retardant material as claimed in claim 14, wherein the salt is selected from the group consisting of sodium acrylate, magnesium acrylate, zinc acrylate, potassium acrylate, bis-sodium-maleate, and their mixtures.

17. A method according to claim 5, wherein the compound of Formula I is added in an amount of from 1.5 to 5 wt. %.

18. A flame-retardant composition according to claim 10, wherein the polymeric matrix is reinforced.

19. A flame-retardant composition according to claim 11, wherein the polymeric matrix is reinforced.

20. A composition according to claim 18, wherein the polymeric matrix is glass fiber reinforced.

21. A composition according to claim 19, wherein the polymeric matrix is glass fiber reinforced.

22. Flame-retardant synthetic articles containing as a flame-retardant material a compound as defined in claim 2.

23. Flame-retardant synthetic articles containing as a flame-retardant material a compound as defined in claim 3.

24. Flame-retardant synthetic articles containing as a flame-retardant material a compound as defined in claim 4.

* * * * *